US008433753B2

(12) United States Patent
Qi

(10) Patent No.: US 8,433,753 B2
(45) Date of Patent: *Apr. 30, 2013

(54) PROVIDING MEETING INFORMATION FROM A MEETING SERVER TO AN EMAIL SERVER TO STORE IN AN EMAIL DATABASE

(75) Inventor: Xiaoying Qi, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1229 days.

This patent is subject to a terminal disclaimer.

(21) Appl. No.: 11/303,609

(22) Filed: Dec. 15, 2005

(65) Prior Publication Data

US 2007/0143412 A1 Jun. 21, 2007

(51) Int. Cl.
*G06F 15/16* (2006.01)
(52) U.S. Cl.
USPC .......................................................... 709/204
(58) Field of Classification Search ........... 709/204–206
See application file for complete search history.

(56) References Cited

U.S. PATENT DOCUMENTS

| 5,050,077 A | 9/1991 | Vincent |
| 5,323,445 A | 6/1994 | Nakatsuka |
| 5,387,011 A | 2/1995 | Freund |
| 5,781,731 A | 7/1998 | Koreeda et al. |
| 5,917,489 A | 6/1999 | Thurlow et al. |
| 6,064,977 A | 5/2000 | Haverstock et al. |
| 6,363,352 B1 | 3/2002 | Dailey et al. |
| 6,457,062 B1 * | 9/2002 | Pivowar et al. ............... 709/248 |
| 6,470,171 B1 | 10/2002 | Helmick et al. |
| 6,505,167 B1 | 1/2003 | Horvitz et al. |
| 6,587,668 B1 | 7/2003 | Miller et al. |
| 6,658,427 B2 | 12/2003 | Kogut-O'Connell et al. |

(Continued)

FOREIGN PATENT DOCUMENTS

| EP | 0 921 670 | 6/1999 |
| JP | 8123767 A | 5/1996 |

(Continued)

OTHER PUBLICATIONS

Orenstein, David. "Quickstudy: Application Programming Interface (API)." [Retreived online on May 22, 2010] Jan. 10, 2000. [Retreived from the internet] <URL: http://www.computerworld.com/s/article/43487/Application_Programming_Interface>.*

(Continued)

*Primary Examiner* — Larry Donaghue
(74) *Attorney, Agent, or Firm* — David W. Victor; Konrad, Raynes, Davda & Victor LLP

(57) ABSTRACT

Provided are a method, system, and program for providing meeting information from a meeting server to an email server to store in an email database. A meeting database has information on scheduled meetings. A meeting server manages access to the meeting database. The meeting server calls an email server to provide information on meetings from the meeting database to an email database including email accounts and calendars of scheduled events for users. The email server manages access to the email database. The email server stores the provided information on the meetings in the email database in response to the call from the meeting server. The email server updates the calendar of scheduled events in the email database for one of the users to include information from the email database on at least one meeting.

36 Claims, 11 Drawing Sheets

U.S. PATENT DOCUMENTS

| | | | |
|---|---|---|---|
| 6,785,868 B1* | 8/2004 | Raff | 715/205 |
| 6,826,551 B1 | 11/2004 | Clary et al. | |
| 6,952,660 B1 | 10/2005 | Matheson | |
| 6,985,924 B2 | 1/2006 | Schwartz et al. | |
| 7,130,885 B2 | 10/2006 | Chandra et al. | |
| 7,251,786 B2 | 7/2007 | Wynn et al. | |
| 7,284,033 B2* | 10/2007 | Jhanji | 709/206 |
| 7,330,875 B1 | 2/2008 | Parasnis et al. | |
| 7,360,164 B2* | 4/2008 | Bjoernsen et al. | 715/751 |
| 7,437,421 B2* | 10/2008 | Bhogal et al. | 709/206 |
| 7,457,870 B1 | 11/2008 | Lownsbrough et al. | |
| 7,533,083 B2 | 5/2009 | Aoki et al. | |
| 7,584,114 B2* | 9/2009 | Estrada et al. | 705/7.23 |
| 7,679,518 B1 | 3/2010 | Pabla et al. | |
| 2001/0052058 A1* | 12/2001 | Ohran | 711/161 |
| 2002/0038293 A1 | 3/2002 | Seiden | |
| 2002/0059030 A1 | 5/2002 | Otworth et al. | |
| 2002/0064766 A1 | 5/2002 | Cozens et al. | |
| 2002/0078019 A1 | 6/2002 | Lawton | |
| 2002/0138582 A1 | 9/2002 | Chandra et al. | |
| 2002/0143664 A1* | 10/2002 | Webb | 705/27 |
| 2002/0154178 A1* | 10/2002 | Barnett et al. | 345/853 |
| 2002/0178043 A1 | 11/2002 | Searles | |
| 2002/0178081 A1 | 11/2002 | Omoto et al. | |
| 2002/0178229 A1 | 11/2002 | Sinha et al. | |
| 2003/0018816 A1* | 1/2003 | Godfrey et al. | 709/246 |
| 2003/0065722 A1 | 4/2003 | Ieperen | |
| 2003/0131059 A1* | 7/2003 | Brown et al. | 709/206 |
| 2003/0191772 A1 | 10/2003 | Schaumann et al. | |
| 2004/0044681 A1 | 3/2004 | Brady et al. | |
| 2004/0073615 A1 | 4/2004 | Darling | |
| 2004/0143472 A1* | 7/2004 | Estrada et al. | 705/8 |
| 2004/0210461 A1 | 10/2004 | Bohle | |
| 2004/0215499 A1 | 10/2004 | Leist | |
| 2004/0215535 A1 | 10/2004 | Leist | |
| 2004/0230843 A1 | 11/2004 | Jansen | |
| 2004/0235520 A1 | 11/2004 | Cadiz et al. | |
| 2005/0010464 A1* | 1/2005 | Okuno et al. | 705/8 |
| 2005/0010639 A1 | 1/2005 | Long et al. | |
| 2005/0015291 A1 | 1/2005 | O'Connor | |
| 2005/0102245 A1 | 5/2005 | Edlund et al. | |
| 2005/0102368 A1 | 5/2005 | Forman et al. | |
| 2005/0120073 A1 | 6/2005 | Cho | |
| 2005/0158697 A1 | 7/2005 | Nelson et al. | |
| 2005/0197894 A1* | 9/2005 | Fairbanks et al. | 705/14 |
| 2005/0267876 A1 | 12/2005 | Watanabe et al. | |
| 2006/0206498 A1 | 9/2006 | Fujiwara | |
| 2006/0218224 A1* | 9/2006 | Agrawal et al. | 709/201 |
| 2007/0016646 A1* | 1/2007 | Tendjoukian et al. | 709/206 |
| 2008/0109521 A1* | 5/2008 | Mousseau et al. | 709/206 |
| 2008/0178297 A1 | 7/2008 | Ikeda et al. | |
| 2009/0018903 A1 | 1/2009 | Iyer | |
| 2009/0248479 A1* | 10/2009 | Johnson et al. | 705/8 |
| 2010/0017371 A1 | 1/2010 | Whalin et al. | |

FOREIGN PATENT DOCUMENTS

| | | |
|---|---|---|
| JP | 8214023 A | 8/1996 |
| JP | 2002092277 A | 3/2002 |
| JP | 2002169939 A | 6/2002 |
| JP | 2003150758 A | 5/2003 |
| JP | 2004334275 A | 11/2004 |
| TW | 200421829 | 10/2004 |
| TW | 200506677 | 2/2005 |
| WO | 97/47120 | 12/1997 |

OTHER PUBLICATIONS

Dieterich, H. and S. Steiner, "Intelligent Agents as Appointed Managers Living in Public Networks", Proceedings of the International Symposium on Human Factors in Telecommunications, 1997, pp. 23-30.

PCT International Search Report and Written Opinion, Mar. 13, 2007, for International Application No. PCT/EP2006/069439.

Anonymous, "Post an Addendum to Meeting Notices on the Calendar", Research Disclosure, Mason Publications, Hampshire, GB, vol. 347, No. 42, Mar. 1993, 1 pp.

IBM Corporation, "Method of Automatic Calendar Update and Notification", IBM Technical Disclosure Bulletin, vol. 37, No. 3, Mar. 1, 1994, p. 237.

PCT International Search Report and Written Opinion, May 11, 2007, for International Application No. PCT/EP2006/069443.

Evite, "Create Your Invitation", [online], [retrieved on Nov. 6, 2005], retrieved from the Internet at <URL: http://www.evite.com/app/create/create/do?type=&isNew=true&x=47&y=11>.

Evite, "Evite 2.0 Final Product Launches, Features the Largest Free Local Events Directory Online", Press Releases, [online], Jul. 12, 2004, [retrieved on Nov. 6, 2005], retrieved from the Internet at <URL: http://www.evite.com/pages/gt/press/pressReleases/071204.jsp>.

Evite, "Frequently Asked Questions", [online], [retrieved on Nov. 6, 2005], retrieved from the Internet at <URL: http://evite.com/pages/custservice/faq.jsp>.

Leporini, C.M., "Throw Out the Old Envelopes, Stamps", Web Review: Technology, [online], Jan. 1, 2004, [retrieved on Nov. 6, 2005], retrieved from the Internet at <URL: http://www.realtor.org/rmomag.NSF/pages/Website200401122?OpenDocument>.

US Patent Application filed on Dec. 15, 2005, entitled "Scheduling and Searching Meetings in a Network Environment", invented by X. Qi.

Notice of Allowance 1, Nov. 28, 2011, for U.S. Appl. No. 11/305,760, filed Dec. 15, 2005 by X. Qi, Total 39 pp. [57.70 (NOA1)].

Amendment 1, Jul. 6, 2009, for U.S. Appl. No. 11/305,760, Total 14 pp.

Amendment 2, Feb. 12, 2010, for U.S. Appl. No. 11/305,760, Total 21 pp.

Amendment 3, Dec. 2, 2010, for U.S. Appl. No. 11/305,760, Total 18 pp.

Final Office Action 1, Nov. 12, 2009, for U.S. Appl. No. 11/305,760, Total 13 pp.

Final Office Action 2, Feb. 9, 2011, for U.S. Appl. No. 11/305,760, Total 17 pp.

Office Action 1, Apr. 3, 2009, for U.S. Appl. No. 11/305,760, Total 28 pp.

Office Action 3, Sep. 2, 2010, for U.S. Appl. No. 11/305,760, Total 20 pp.

English Abstract for TW200421829, published on Oct. 16, 2004, Total 1 p.

English Abstract for TW200506677, published on Feb. 16, 2005, Total 4 pp.

IDS Report, Apr. 16, 2012, from the Mar. 16, 2012 Office Action, Total 2 pp.

English Abstract and Machine Translation for JP8214023A, published Aug. 20, 1996.

English Abstract and Machine Translation for JP2004334275A, published Nov. 25, 2004.

English Abstract and Machine Translation for JP2002169939A, published Jun. 14, 2002.

English Abstract and Machine Translation for JP8123767A, published May 17, 1996.

English Abstract and Machine Translation for JP2002092277A, published Mar. 29, 2002.

English Abstract and Machine Translation for JP2003150758A, published May 23, 2003.

IDS Report, Nov. 2, 2011, from the Oct. 4, 2011 Office Action, Total 3 pp.

* cited by examiner

Meeting Entry Form

- Meeting Name:
- Date:
- Time:
- Location:
- Meeting URL:
- Dial-in Number:
- Posting Info:

[Update] (62)  [Delete] (64)  [Check Roster] (66)

(68) [Send Invitation]  [Update Invitation] (69)

Search Results (70)

Registration — 76
Name [ ]   email [ ]
[Register] — 80

| Meeting Name (72) | Meeting Information | Date | Scheduled Time | Meeting URL | Call-in Number | Page URL (74) |
|---|---|---|---|---|---|---|
| ☐ | | | | | | |
| ☐ | | | | | | |

| Scheduled Meeting | |
|---|---|
| Meeting Name: | Writing Computer Programs |
| Date: | March 23, 2006 |
| Time: | 1:30PM (EST) |
| Location: | Conference Room East |
| Meeting URL: | www.acme.local.meeting |
| Dial-in Number: | 555-5553 |
| Posting Info: | www.acme.local.meetingpage |

FIG. 9

PROVIDING MEETING INFORMATION FROM A MEETING SERVER TO AN EMAIL SERVER TO STORE IN AN EMAIL DATABASE

BACKGROUND OF THE INVENTION

1. Field of the Invention

The present invention relates to a method, system, and program for providing meeting information from a meeting server to an email server to store in an email database.

2. Description of the Related Art

When scheduling a meeting with a group of users, the organizer of the meeting may send an email to invitees, or potential participants. The invitees may then respond via a reply email indicating whether or not they will attend the meeting. The email to the invitees may include controls to allow the invitee to indicate whether they will accept, decline, etc. When the invitee selects the control to accept or attend the meeting, the scheduled meeting may be added to the user's calendar. The organizer may keep track of the attendees through the email program.

Notwithstanding, there is a need in the art for improved techniques to organize meetings over a network and to enable users in-the network to access information about scheduled meetings

SUMMARY

Provided are a method, system, and program for providing meeting information from a meeting server to an email server to store in an email database. A meeting database has information on scheduled meetings. A meeting server manages access to the meeting database. The meeting server calls an email server to provide information on meetings from the meeting database to an email database including email accounts and calendars of scheduled events for users. The email server manages access to the email database. The email server stores the provided information on the meetings in the email database in response to the call from the meeting server. The email server updates the calendar of scheduled events in the email database for one of the users to include information from the email database on at least one meeting.

In a further embodiment, the meeting server calls the email server to provide information on one meeting from the meeting database in response to creating information in the meeting database for the meeting.

In a further embodiment, the information on the meeting provided to the email server includes message addresses of invitees to the meeting. The message address identifies an email account and associated calendar in the email database. The meeting server submits email invitations including information on one of the meetings to the message addresses of the invitees to the meeting. The email invitation includes a user selectable call that invokes the email server to schedule the meeting. The email server stores the received emails in the email accounts of the invitees in the email database. The email server receives invitee invocation via the user selectable call to schedule the meeting. The email server updates the calendar for the invitee to indicate the meeting as scheduled for the invitee in response to receiving the invitee invocation to schedule the meeting.

In a further embodiment, the information on the meeting includes message addresses of invitees to the meeting that are directed to an email server maintaining the email accounts and calendars in the email database. The email server transmits a message to the user accounts of the invitees of the meeting in response to the call from the meeting server. The email server receives invocation from one of the invitees that received the message to schedule the meeting. The email server updates the calendar for the invitee to indicate the meeting as scheduled for the invitee in response to receiving the invocation to schedule the meeting.

In a further embodiment, the message includes a user selectable call that when selected by the invitee invokes the email server to schedule the meeting.

In a further embodiment, the meeting server receives an update to the information for one of the meetings in the meeting database. The meeting server calls the email server to provide the update for the meeting added to the meeting database to the email database to store in the email database. The email server updates the calendars of users whose calendars include information on the updated meeting to indicate the update to the information in response to the call by the meeting server.

In a further embodiment, the email server transmits a message to the users whose calendars are scheduled with the updated meeting providing notification of the update to the calendar.

In a further embodiment, the email server receives indication that the message was viewed by one user. The calendar of the user that viewed the message is updated with the update to the information for the meeting in response to receiving the indication that the message was viewed.

In a further embodiment, the meeting database includes identifiers for meetings created in the meeting database. The meeting server creates identifiers for the information on the meetings stored in the email database in response to storing the information on the meetings in the email database. The email server provides, for each of a plurality of meetings stored in the email database, an association of one identifier in the meeting database and one identifier in the email database for one meeting.

In a further embodiment, the meeting server calls the email server to provide an update to the information for one of the meetings in the meeting database including the identifier in the meeting database of the updated meeting. The email server determines from the associations the identifier in the email database associated with the received identifier of the updated message in the meeting database in response to the call from the email server to provide the update. The email server uses the determined identifier in the email database to update the information in the email database for the identified meeting with the received update.

In a further embodiment, the information for the updated meeting in the email database indicates users whose calendars are scheduled with the updated meeting. The email server updates the calendars of the indicated users with the received update.

BRIEF DESCRIPTION OF THE DRAWINGS

FIG. 3 illustrates an embodiment of a meeting entry form an organizer uses to provide information on a meeting.

FIG. 4 illustrates an embodiment of a search result form returned to a user having search results of meetings from a meeting database.

FIG. 9 illustrates an embodiment of scheduled meeting information included in a user calendar in an email database.

DETAILED DESCRIPTION

Figure 1:
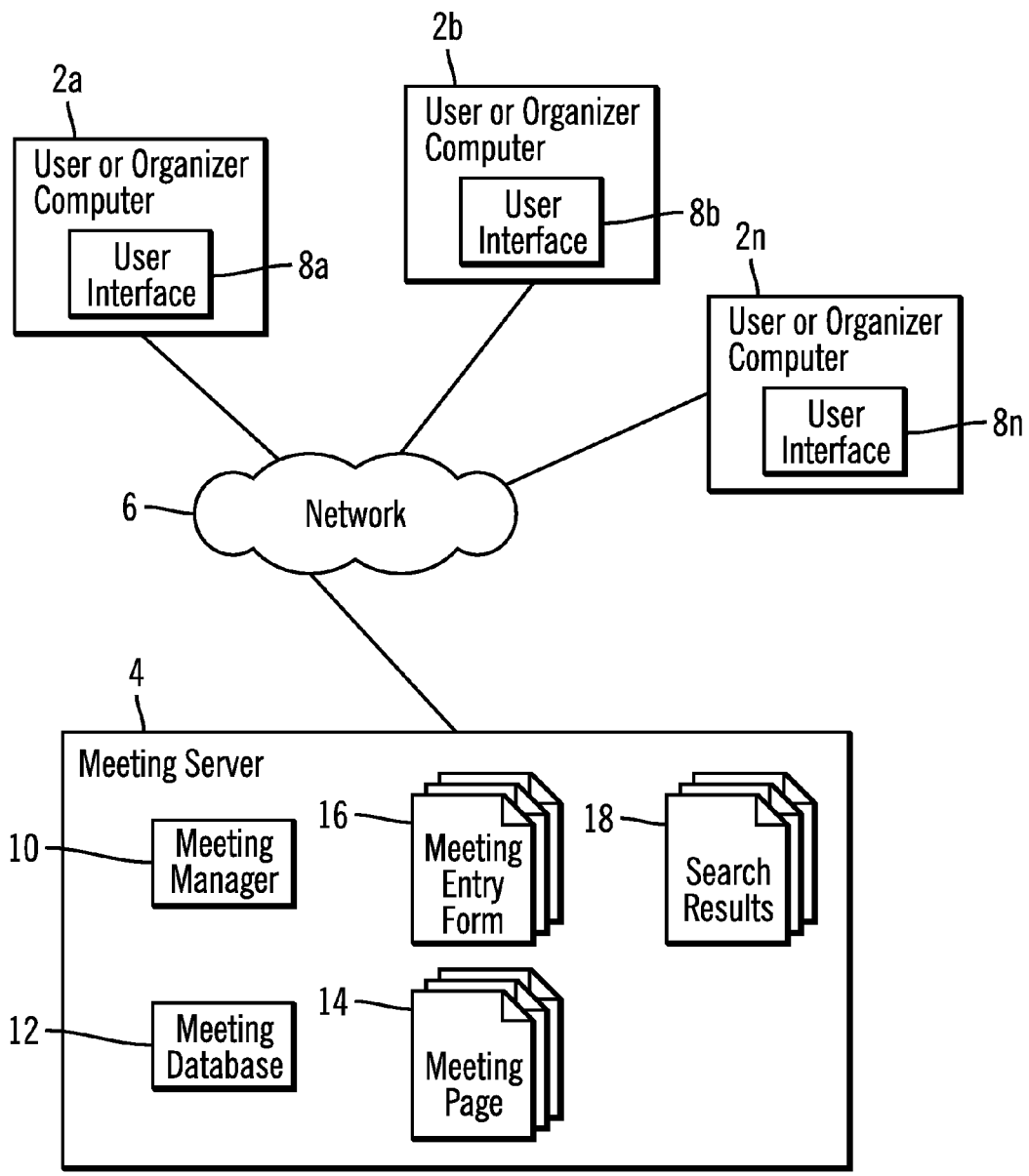
FIG. 1 illustrates an embodiment of a network computing environment.

FIG. 1 illustrates an embodiment of a network computing environment. A plurality of user or organizer computers 2a, 2b . . . 2n communicate with a meeting server 4 over a network 6. Each of the user or organizer computers 2a, 2b . . . 2n include a user interface 8a, 8b . . . 8n to render pages of information transmitted from the meeting server 4. The meeting server 4 includes a meeting manager 10 program that maintains information on scheduled meetings in a meeting database 12. The meeting manager 10 implements a network server, e.g., a web server, to respond to requests for pages and information from the computers 2a, 2b . . . 2n and a database engine to query the meeting database 12. The meeting manager 10 web server may respond to requests in the Hypertext Transport Protocol (HTTP) format or requests in other file transfer protocols known in the art. The meeting manager 10 generates a meeting page 14 for each meeting generated in the meeting database 12 providing information on a scheduled meeting. The meeting manager 10 further generates meeting entry forms 16 to transmit to the organizer computers 2a, 2b . . . . 2n to enable an organizer to create a meeting to add to the meeting database 12. The meeting manager 10 further generates search results 18 having a list of zero or more meetings that satisfy a query from the user computers 2a, 2b . . . 2n.

Certain of the components shown in the meeting server 4, such as the meeting database 12 and forms 14 and 16, may be stored in a storage device to which the meeting server 4 is connected and loaded into a memory (not shown) of the meeting server 10 for access by the meeting manager 10.

The computers 2a, 2b . . . 2n may comprise computing devices known in the art, such as a server, mainframe, workstation, personal computer, hand held computer, laptop, telephony device, network appliance, etc. The meeting server 4 may comprise a server class machine capable to process and service meeting related requests from multiple computers 2a, 2b . . . 2n. The network 6 may comprise a Storage Area Network (SAN), Local Area Network (LAN), Intranet, the Internet, Wide Area Network (WAN), a wireless network, peer-to-peer network, etc. The meeting database 12 may comprise a relational or other type of database system. The meeting database 12 and other information used by the meeting manager 10 may be stored in a storage system separate from the meeting server 10.

A meeting may comprise a scheduled event such as a technical presentation, training session, corporate meeting or presentation, personal meeting, etc. In certain embodiments, the meeting is an event for which materials are to be presented and that may be recorded, such that through the meeting server 4, users may access the soft copies of the presentation materials as well as a recording that may be downloaded over the network 6, such as a video or audio file recording of the presentation.

Figure 2:
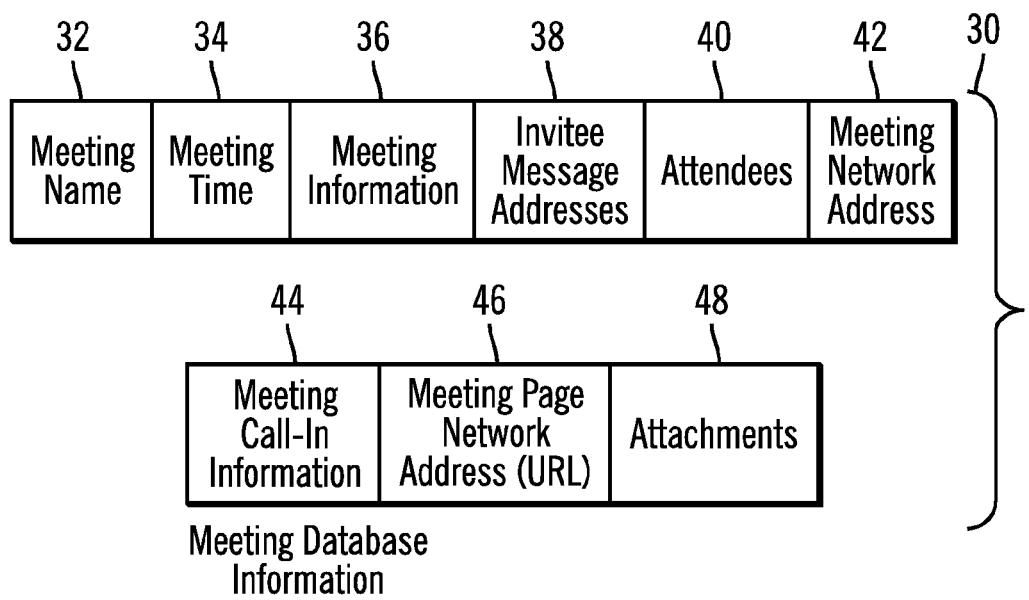
FIG. 2 illustrates an embodiment of meeting information maintained in the database.

FIG. 2 illustrates an embodiment of meeting information 30 maintained in the meeting database 12 for one meeting, including: a meeting name 32, a meeting time 34 (e.g., start and end times); meeting information 36 such as the subject matter, presenter, location, etc.; invitee message addresses 38 (e.g., email address, instant messenger address or other network address) of those users invited to the meeting; attendees 40 comprising those invitees that have confirmed they will attend the scheduled meeting; meeting network address 42 comprising an address, e.g., a Uniform Resource Locator (URL), if a broadcast of the meeting is available over the network 6; meeting call-in information 44 if the meeting is attended via telephone; a meeting page network address 46 of the meeting page 14 providing information on the meeting; and optional attachments 48 of any electronic copies of materials related to the meeting, such as document files, power point presentations, slide shows, video and/or audio files, etc. In certain embodiments, information for meetings may be maintained in the database 12 after the scheduled time for the meeting with information on the meeting, including a possible link to a network resource to allow the user to listen or view the meeting at their computer 2a, 2b . . . 2n if a video or audio file of the meeting is saved and referenced in the meeting information in the database 12.

FIG. 3 illustrates a meeting entry form 60, such as meeting entry form 16, including fields in which an organizer can enter at their computer 2a, 2b . . . 2n information on a meeting to add to the meeting database 12, such as the meeting name, date, time, location, etc. The meeting entry form 60 includes an update button 62 to enable the user to update information for the meeting 30 (FIG. 2), a delete button 64 to delete the meeting 30 (FIG. 2) for which the form 60 is displayed, a check roster button 66 to display the attendees 40 and/or invitees 38, a send invitation button 68 to send an invitation to the invitee and/or attendee message addresses 38, and an update invitation button 69 to enable updating or changing the invitation sent to the invitees 38.

FIG. 4 illustrates an embodiment of a search results page 70, such as search results 18, having information on meetings in the database 12 satisfying a query. The search results page 70 includes a list of meetings 72 that satisfy the query, including information on the meeting and a link 74 to the meeting page 14 having information on the meeting. The search results page 70 also includes a registration section 76 that the user may use to add themselves as an invitee of selected listed meetings that have not already occurred. A listed meeting may be selected by checking the check boxes 78. The user may enter their name and email in the registration section 76 and then select the register button 80 to add themselves as a registered attendee 40 (FIG. 2) of the selected meetings. The meetings listed in the search results 72 may include meetings that have not yet occurred and meetings that have already occurred. The listed search results for meetings that have occurred may include a link to a network address of the meeting page 14 to allow the user to obtain information on the meeting, including access to any stored video or audio file for the meeting available over the network 6. In certain embodiments, the user may be prevented from registering as an attendee for a listed meeting 76 that has already occurred.

The forms and pages the meeting manager 10 transmits to the user or organizer computers 2a, 2b . . . 2n to render in the user interface 8a, 8b . . . 8n may comprise a structured document page, such as encoded in a hypertext markup language (HTML), Extended Markup Language (XML), etc. The meeting server 4 and computers 2a, 2b . . . 2n may use a file transfer protocol, such as the Hypertext Transport Protocol (HTTP) or other suitable file transfer protocols known in the art, to transfer electronic pages and entry forms.

Figure 5:
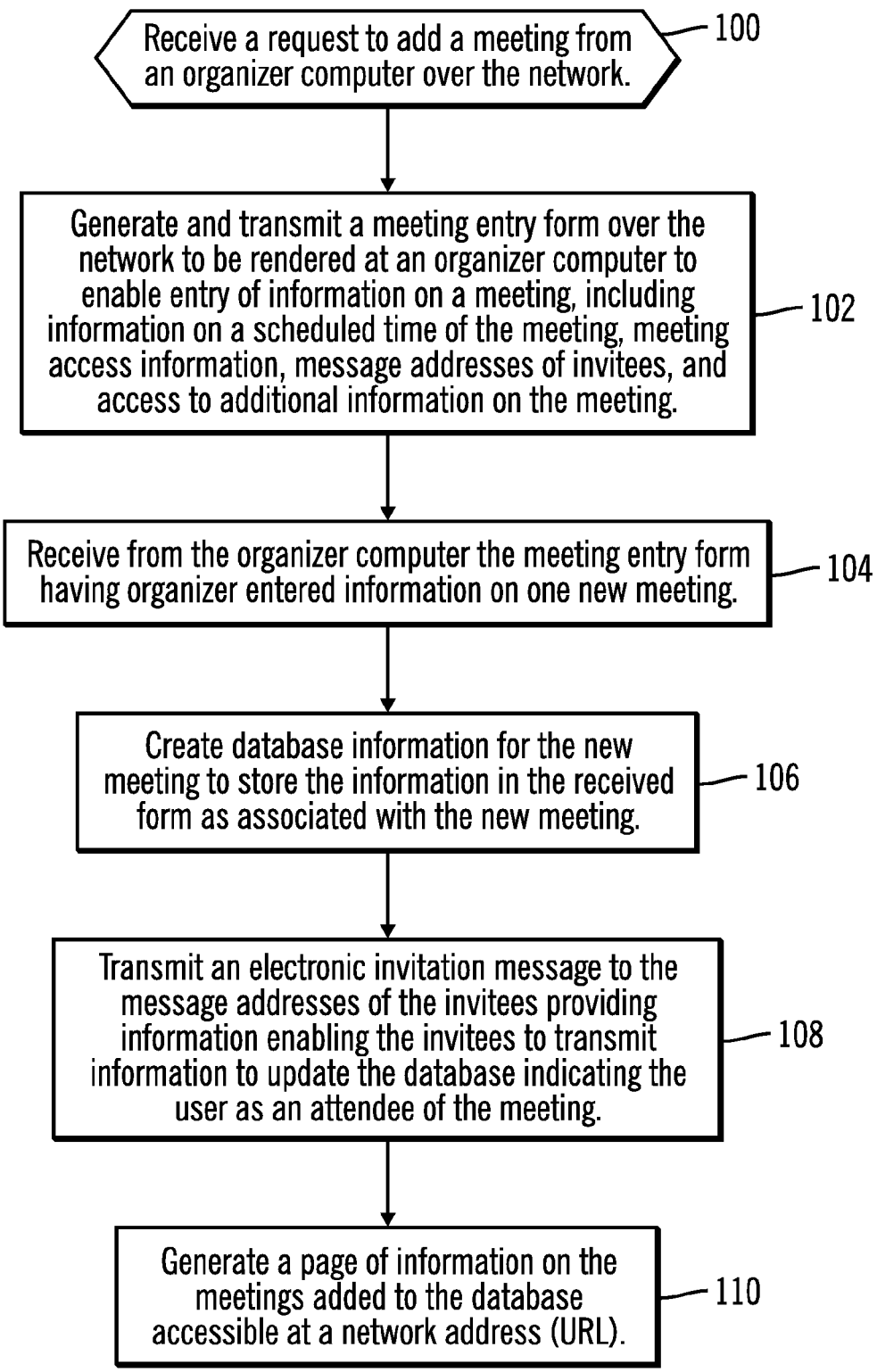
FIG. 5 illustrates an embodiment of operations to add a meeting to the meeting database.

FIG. 5 illustrates an embodiment of operations implemented by the meeting manager 10 to add a meeting to the meeting database 12. In response to receiving (at block 100) a request to add a meeting from one organizer computer 2a, 2b . . . 2n over the network 6, the meeting manager 10, operating as a web server, generates (at block 102) and transmits a meeting entry form 60 (FIG. 3) over the network 6 to be rendered in the user interface 8a, 8b . . . 8n of the requesting organizer computer 2a, 2b . . . 2n. The meeting entry form 60 (also shown as form 16 in FIG. 1) enables the organizer to enter information on a meeting, including information on a scheduled time of the meeting, meeting access information, message addresses of invitees, access to additional information on the meeting, and any other information maintained for a meeting, e.g., 30, in the meeting database 12. In response to receiving (at block 104) the filled-in meeting entry form 60 from the organizer computer 2a, 2b . . . 2n having organizer entered information on one new meeting, the meeting manager 10 creates (at block 106) database 12 information for the new meeting to store the information in the received new meeting form 60 as associated with the new meeting.

The meeting manager 10 may transmit (at block 108) an electronic invitation message to the message addresses 38 (FIG. 2) of the invitees providing information enabling the invitees to transmit information to the meeting server 4 to register as an attendee and record the registered user as an attendee 40 in the meeting database information 30. The electronic invitation message may comprise an email sent to the email message address for the attendee 40 that includes a graphical control, such as a hypertext link, that when selected transmits a message to the meeting server 4 to add the invitee as an attendee to the attendees information 40. In further embodiments, the message sent to the invitees may include a function to update an electronic calendar of the invitee to include a scheduled event for the meeting. The meeting manager 10 may further generate (at block 110) a meeting page 14 of information on the meeting added to the database 12 accessible at a network address (URL). The URL of the meeting page is also added as field 46 to the meeting database information 30.

Figure 6:
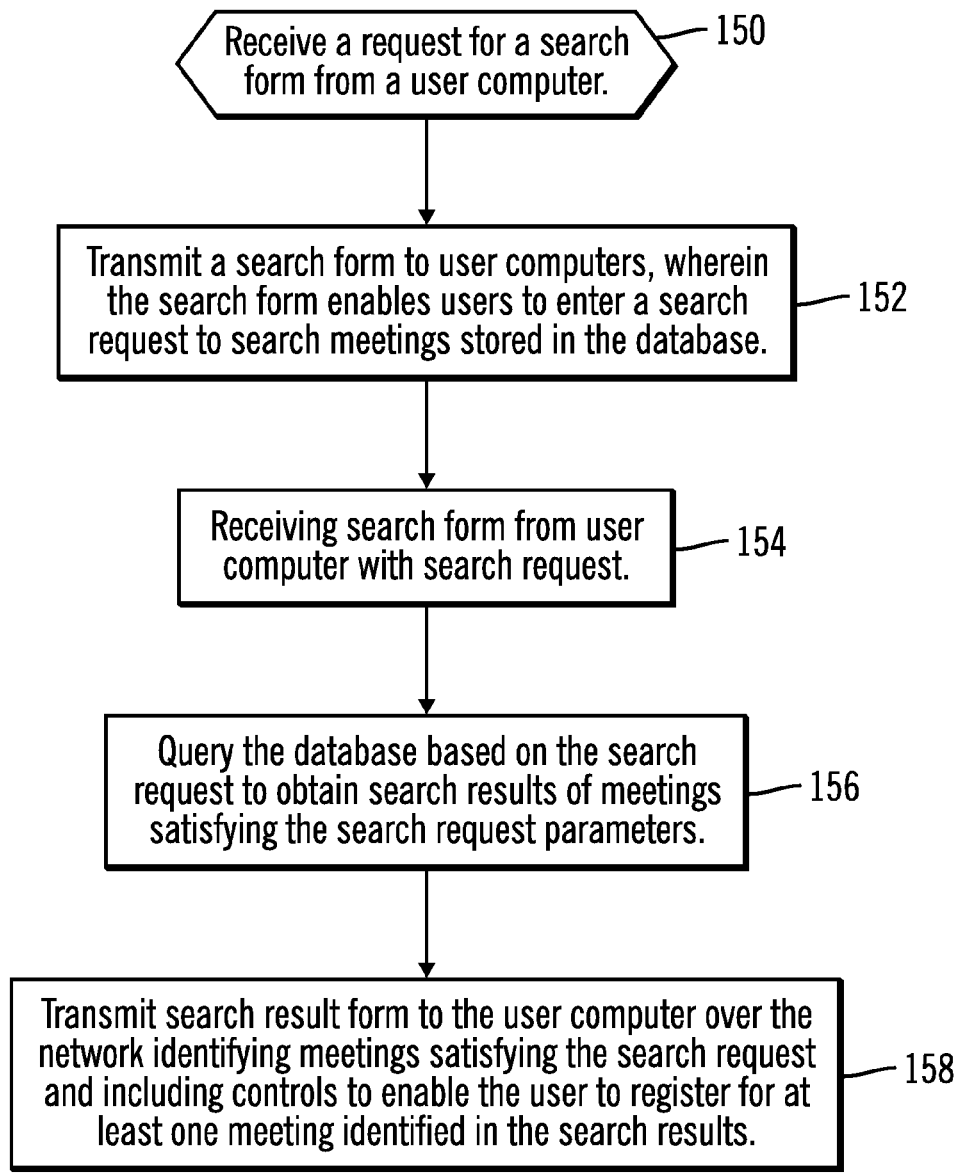
FIG. 6 illustrates an embodiment of operations to search for meetings in the meeting database.

FIG. 6 illustrates an embodiment of operations the meeting manager 10 performs to process a search request from a user or organizer computer 2a, 2b . . . 2n. Upon receiving (at block 150) a request for a search form, such as an HTML page, from a user computer 2a, 2b . . . 2n, the meeting manager 10 transmits (at block 152) a search form to the requesting user computer 2a, 2b . . . 2n, wherein the search form includes controls; such as entry fields, hypertext links, and transmit controls to enable the user to enter a search request to search meetings stored in the database 12 and transmit the search request to the meeting server 4. Upon receiving (at block 154) the search form from the user computer 2a, 2b . . . 2n with the search request, i.e., search criteria and predicates, the meeting manager 10 queries (at block 156) the meeting database 12 based on the search request to obtain search results of meetings satisfying the search request criteria and parameters. The meeting manager 10 transmits (at block 158) a search result form 70 (FIG. 4) to the user computer 2a, 2b . . . 2n over the network 6 identifying meetings satisfying the search request in the meetings list 72. The search result form 70 may include controls to enable the user to register for at least one meeting identified in the search results. For instance, as shown in FIG. 4, the search results form 70 may include the ability to select one or more listed meetings that have not yet occurred and then select the register button 80 to transmit information to the meeting server 4 indicating the user as an attendee of the meeting. Further, the search results 72 may include URLs of the meeting page 14 having information on the event that the user may select to access the meeting page to obtain further information on the meeting, such as files having presentation materials, etc.

In certain embodiments, the user may obtain search results including meetings in which the user doing the search is not an invitee and in which the user is an indicated invitee. For those meetings indicated in the search results for which the user was not designated as an invitee by the organizer, the user may select to be added as an invitee to the meeting.

Figure 7:
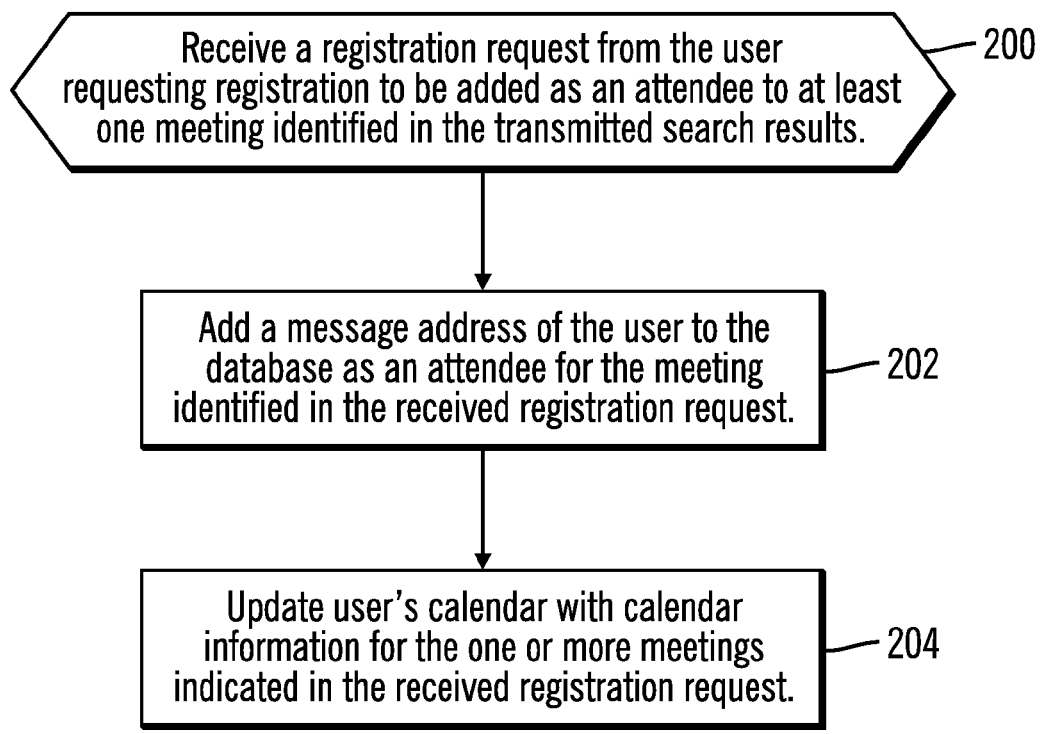
FIG. 7 illustrates an embodiment of operations to process a registration request for one or more meetings.

FIG. 7 illustrates an embodiment of operations performed by the meeting manager 10 to process a registration request from a user computer 2a, 2b . . . 2n. In response to receiving (at block 200) a registration request, the meeting manager 10 adds (at block 202) a message address of the user to the attendee information 40 for the meeting information 30 in the database 12 for the one or more meetings identified in the received registration request. In an alternative embodiment, the user may also be added as an invitee 38 of the one or more identified meetings in the registration request. The registration request may be generated and transmitted from one user computer 2a, 2b . . . 2n to the meeting server 4 in response to the user selecting one or more meetings, e.g., via the checkboxes 78, entering their name and email address and then selecting the register button 80 in the registration section 76. The meeting manager 10 may update (at block 204) the user's calendar with calendar information for the one or more meetings indicated in the received registration request.

In certain embodiments, the user may perform from a received search results form 70 the operations of adding themselves as attendees 40 of one or more meetings and having their electronic calendar's updated with information on meetings for which they have registered through the search results 70 form in the manner described below. Thus, by selecting the register button 80, users may perform in a "single click" (or multiple clicks) the operations of adding themselves as an attendee and having their calendar updated with information on the event for which they registered without having to perform any additional intervening operations.

In further embodiments, the meeting manager 10 may transmit an electronic form to the message address of one of the invitees to enable attendees to remove themselves as an attendee 40 for the meeting in the database 12.

In still further embodiments, the meeting manager 10 may transmit a form to the organizer computer 2a, 2b . . . 2n to enable the organizer to update information in the database for the meeting, such as the information 30. After the information 30 for the meeting in the meeting database 12 is updated, the meeting manager 10 may generate and transmit electronic messages to the message addresses of the invitees and/or attendees for the meeting, indicating the updated information.

Meeting Server to Email Server Invocation

Figure 8:
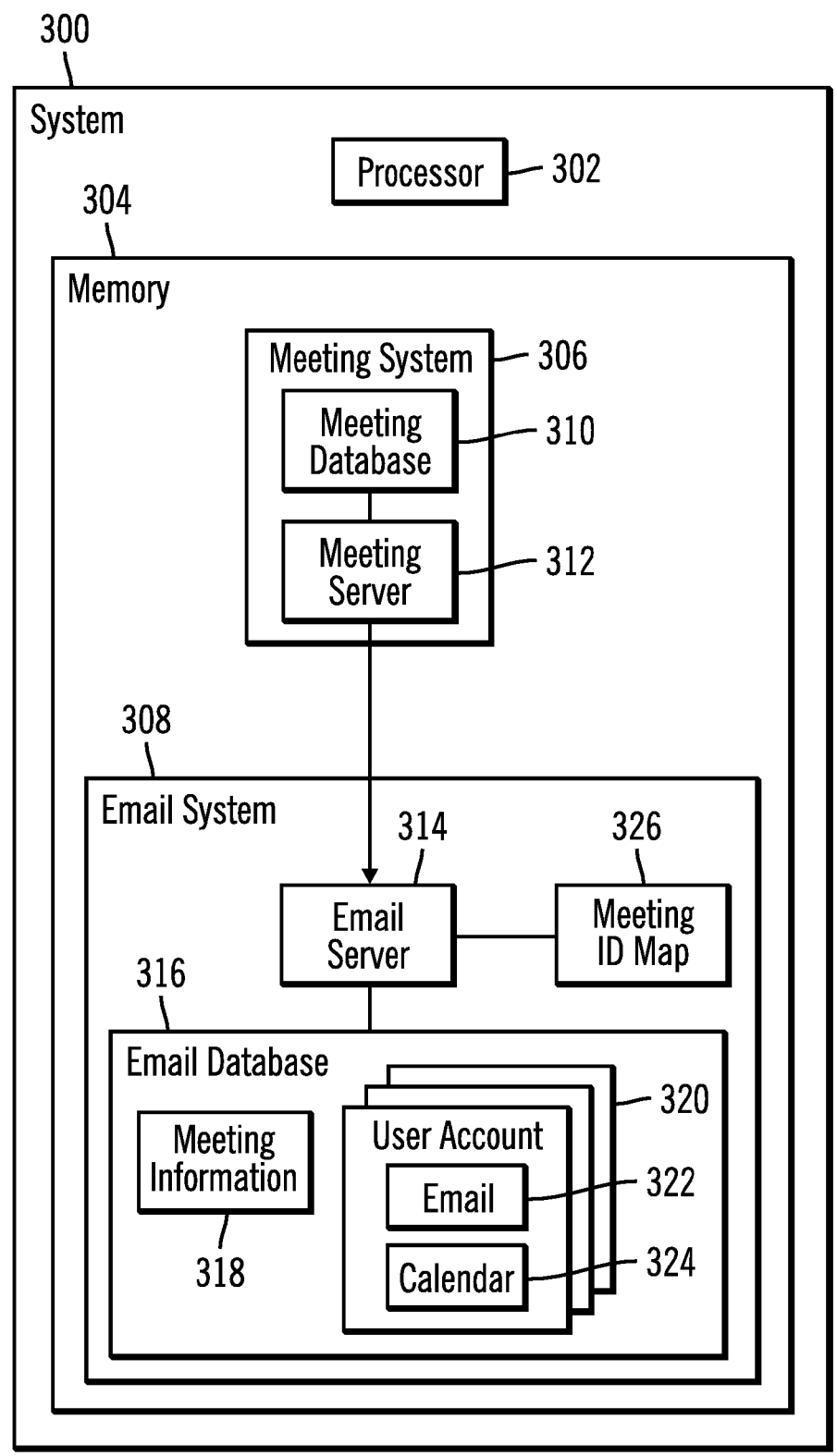
FIG. 8 illustrates an embodiment of a meeting system and email system.

FIG. 8 illustrates an embodiment of a computing environment for the meeting and email servers. A system 300 includes a processor 302 and a memory 304 including code and information executed by the processor 302. In one embodiment, a meeting system 306 and an email system 308 are implemented in the same system 300, but may execute in different processes managed by a same (or different) operating system (not shown) in the system 300. The meeting system 306 includes a meeting database 310, such as meeting database 12 (FIG. 1), storing meetings and a meeting server 312, such as the meeting server 4 including the meeting manager 10 managing access to the meeting database 12. The email system 308 includes an email server 314 managing access to an email database 316. The email database 316 includes meeting information 318 having entries for meetings, mirroring some or all of the meeting information in the meeting database 310, such as the meeting database information 30 shown in FIG. 2. The email database 316 further includes user accounts 320, where each user account includes an email component 322 and a calendar component 324 having user scheduled events. The email component 322 may include an inbox, outbox, sent items, etc. for users, such as found in email systems known in the art. The email server 314 further maintains a meeting identifier (ID) map 326 that associates an identifier of a meeting in the meeting database 310 with an identifier of the same meeting in the email database 316.

The email database 316 may comprise the email database updated with information on a meeting in the meeting database in response to a registration request according to the operations described in FIG. 7, such as in response to a registration request initiated by selection of the register button 80 in FIG. 4.

In one embodiment, the meeting 312 and email databases 314 may be implemented with different database technologies, such as databases from different vendors. Further, the meeting server 312 and email server 314 may be implemented in different application environments. For instance, the meeting server 312 may be implemented in application programming interfaces (APIs) developed and implementing using the Java 2 Platform, Enterprise Edition (J2EE) programming model and platform, C, C++ or other suitable application programming languages. The email server 314 may be implemented in APIs in another application model, such as a Java or other syntax specific to the email server 314 environment, which may differ-from the programming model used to implement the meeting server 312. The email server 314 may comprise an integrated email and calendaring program, such as Lotus Notes®, Microsoft® Exchange, etc. (Microsoft is a registered trademark of Microsoft Corporation and Lotus Notes is a registered trademark of International Business Machines Corp.). The email server 314 may also be capable of handling electronic messages in different formats, such as including a messenger server component to handle instant messages. In one embodiment, the meeting server 312 APIs cannot directly interact with the email database 316 to provide meeting information from the meeting database 310 to store in the email database 316. In such case, the meeting server 312 must call email server 314 APIs to provide meeting information to the email database 316. In certain embodiments, the meeting server 312 may call the email server 314 APIs to directly provide meeting information to store as meeting information 318 in the email database 316 and to user calendars 324 in the email database 316. In an alternative embodiment, the meeting 310 and email database 316 may be implemented using a same database product or within the same database, but in different tables in the database.

In an embodiment where the meeting system 306 and email system 308 are operating in a same host or runtime environment, then the meeting server 312 may invoke the email server APIs 314 by direct system calls. In additional embodiments, where the meeting server 312 and email server 314 execute on different hosts or within different runtime environments in the same host, then the meeting server 312 may use a remote procedure call to invoke the email server 314 APIs, such as a Java Remote Method Invocation (RMI).

FIG. 9 illustrates an example of information maintained for a scheduled meeting in a user's calendar 324. For instance, user selection of the meeting noted in a weekly, daily or monthly calendar may display a scheduled meeting page 350 having information on the meeting. The information maintained in the scheduled meeting page 350 in the user calendar 324 may be populated from meeting information 318 stored in the email database 316.

Figure 10:
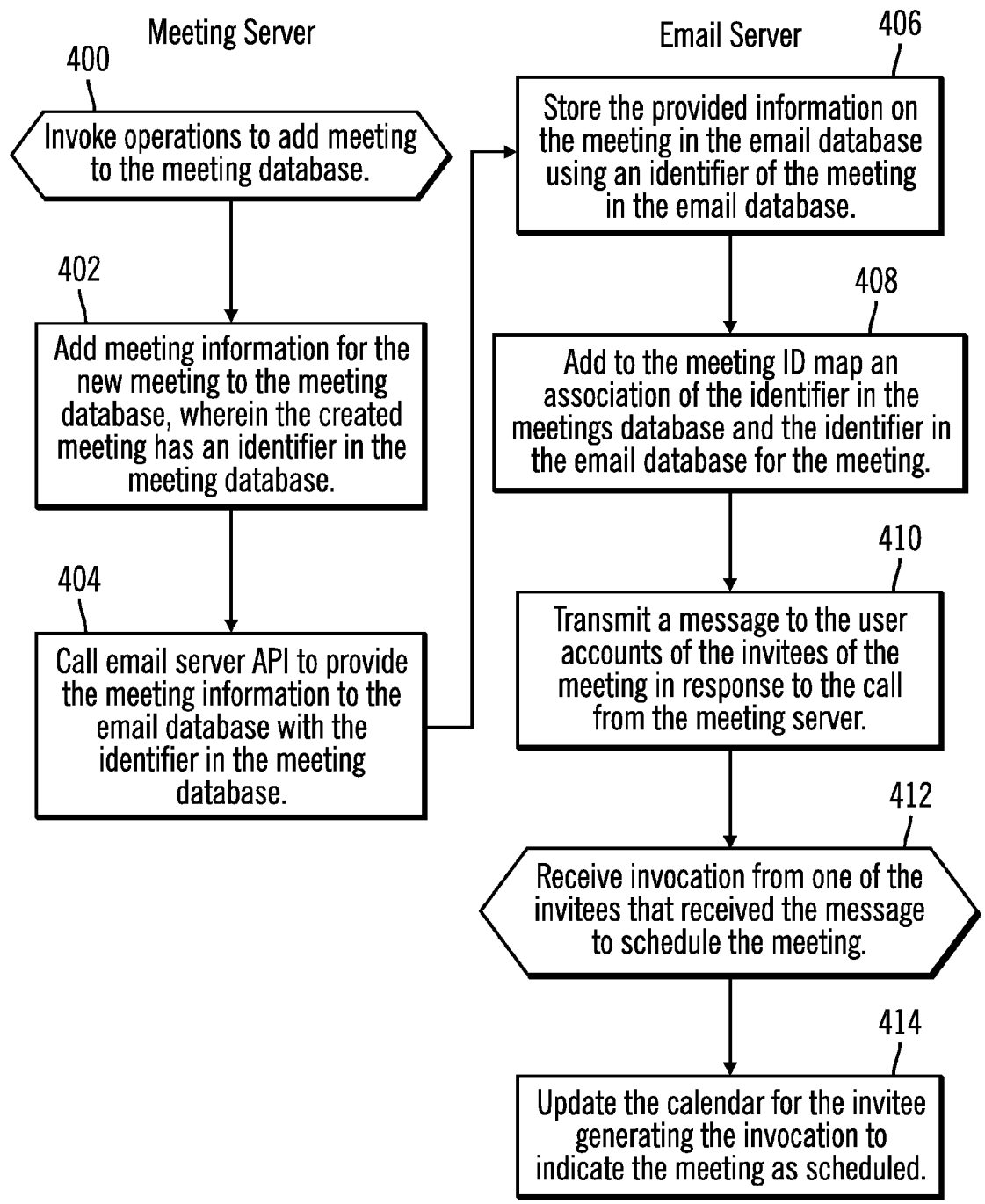
FIGS. 10 and 11 provide embodiments of operations to provide meeting information added to the meeting database to the email server to store in the email database.

FIG. 10 illustrates an embodiment of operations performed by the meeting server 312 and the email server 314 to provide meeting information in the meeting database 310 to the email database 316. In FIG. 10, the meeting server 312 performs operations 400-404 and the email server 314 performs the operations 406-414. In response (at block 400) to the meeting server 312 being invoked to add a new meeting to the meeting database 310, the meeting server 312 adds (at block 402) meeting information for the new meeting to the meeting database 310. The created meeting has a unique identifier in the meeting database 310, such as a session identifier, primary key, or other unique identifier. The meeting server 312 calls (at block 404) an email server 314 API to provide the meeting information to the email database 316 with the identifier of the meeting in the meeting database 310.

The called email server 314 API calls database commands to store (at block 406) the provided information on the meeting in the email database 316 using an identifier of the meeting in the email database 316. For instance, the called email server 314 API may create a new entry in the email database 316 having an identifier to store the provided meeting information. The email server 314 further adds (at block 408) to the meeting ID map 326 an association of the identifier in the meetings database 310 and the identifier in the email database 316 of the new meeting. As discussed, the meeting information 30 (FIG. 2) includes information on the invitees 38. The email server 314 may further transmit (at block 410) a message to the user accounts 320 of the invitees of the meeting. Thus, the call from the meeting server 312 invokes a series of operations by the email server 314 to update the email database 316 and provide a message to invitees notifying them of the meeting. In an alternative embodiment, the meeting server 312 may send emails to the invitees notifying them of the event. In one embodiment, the meeting server 312, through the email server API calls, may transmit information on meetings directly to the email 322 of user accounts 316 without having to transmit the information in a message over a network through which emails are normally transmitted. In an additional embodiment, the meeting server 312 and email server 314 may communicate over an internal network.

In response to receiving (at block 412) invocation from one of the invitees that received the message to schedule the meeting, i.e., add the invitee as an attendee, the email server 314 updates (at block 414) the calendar 324 for the invitee generating the invocation to indicate the meeting as scheduled. In one embodiment, the message sent to the user account 316 of the invitees may comprise an email message or an event message stored in an event inbox of the user account 320. Further, in the embodiment of FIG. 10, the email server 314 provides the message notifying the invitee of the meeting without requiring additional calls by the meeting server 312 to send the notification message.

The notification message may include a user selectable command, such as a graphical button, that invokes the email server 314 to add information on the meeting to the invitee's calendar 324 as a scheduled or accepted event. Upon invoking the email server 314 from the message, the user may be added as an attendee 40 (FIG. 2) to the meeting information 318 for the meeting. The meeting server 312 may be notified by the email server 314 when the user becomes an attendee so the meeting database 310 may update the attendees 40 (FIG. 2) information for the meeting to indicate the invoking invitee as an attendee.

Figure 11:
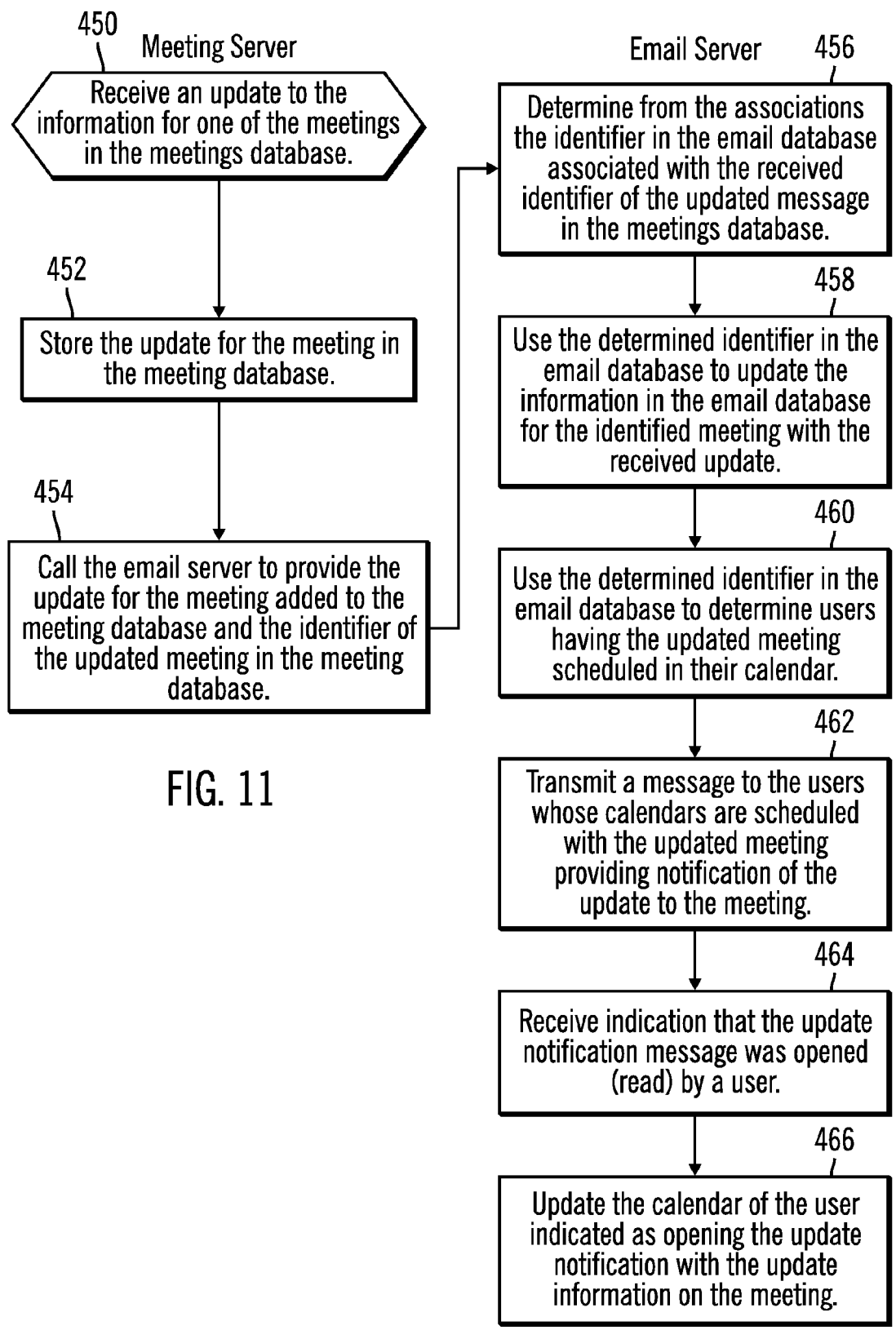

In an additional embodiment, the meeting server 312 may call the email server 314 to update a user's calendar 324 at block 412 with information on one or meetings for which the user registers through a search results form 70 (FIG. 4) by selecting the register button 80. Thus, the meeting server 312 may perform the operation at block 204 in FIG. 7 by calling an email server 314 API to cause the email server 314 to add information on a selected one or more registered meetings (which may have been registered through the search results 70 form) to the user's calendar FIG. 11 illustrates an embodiment of operations performed by the meeting server 312 and email server 314 when the information 30 (FIG. 2) for a meeting in the meeting database 310 is updated. In FIG. 11, the meeting server 312 performs operations 450-454 and the email server 314 performs the operations 456-466. Upon receiving (at block 450) an update to the information 30 (FIG. 2) for one of the meetings in the meetings database 310, the meeting server 312 stores (at block 452) the update for the meeting in the meeting database 310. The meeting server 312 calls (at block 454) an email server 314 API to provide the update for the meeting added to the meeting database 310 and the identifier of the updated meeting in the meeting database 310.

In response to the call, the email server 314 determines (at block 456) from the associations in the meeting ID map 326 the identifier in the email database 316 associated with the received identifier of the updated message in the meetings database 310. The email server 314 uses (at block 458) the determined identifier in the email database 316 to update the information in the email database 310 for the identified meeting with the received update. The email server 314 uses (at block 460) the determined identifier in the email database 316 to determine users having the updated meeting scheduled in their calendar 324, which may comprise those users indicated as attendees in the attendees 40 information for the updated meeting in the email database 310. The attendees 40 information in the email database 310 may be accessed using the determined identifier for the updated meeting in the email database 310.

The email server 314 transmits (at block 462) a message to the determined users, i.e., the users whose calendars are scheduled with the updated meeting, providing notification of the update to the meeting information. In one embodiment, the email server 314 may receive (at block 464) indication that the update notification message was opened (read) by a user. In response to receiving this indication that the notification message was opened, the email server 314 may in response automatically update (at block 466) the calendar 324 of the user indicated as opening the update notification with the update information on the meeting. For instance, the email server 314 may update the meeting information in the scheduled meeting page 350 in the calendar 324. In an alternative embodiment, the email server 314 may automatically update the calendar 324 with the updated meeting information of attendee users without waiting for acknowledgment that the user/attendee opened the notification message. In such case, the notification indicates updates to the calendar 324 that have already occurred.

Described embodiments provide techniques for a meeting server to provide information on a meeting to an email server to provide to invitees of the meeting and store in an email database and in the calendar of invitees selecting to accept the scheduled meeting.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

Figure 12:
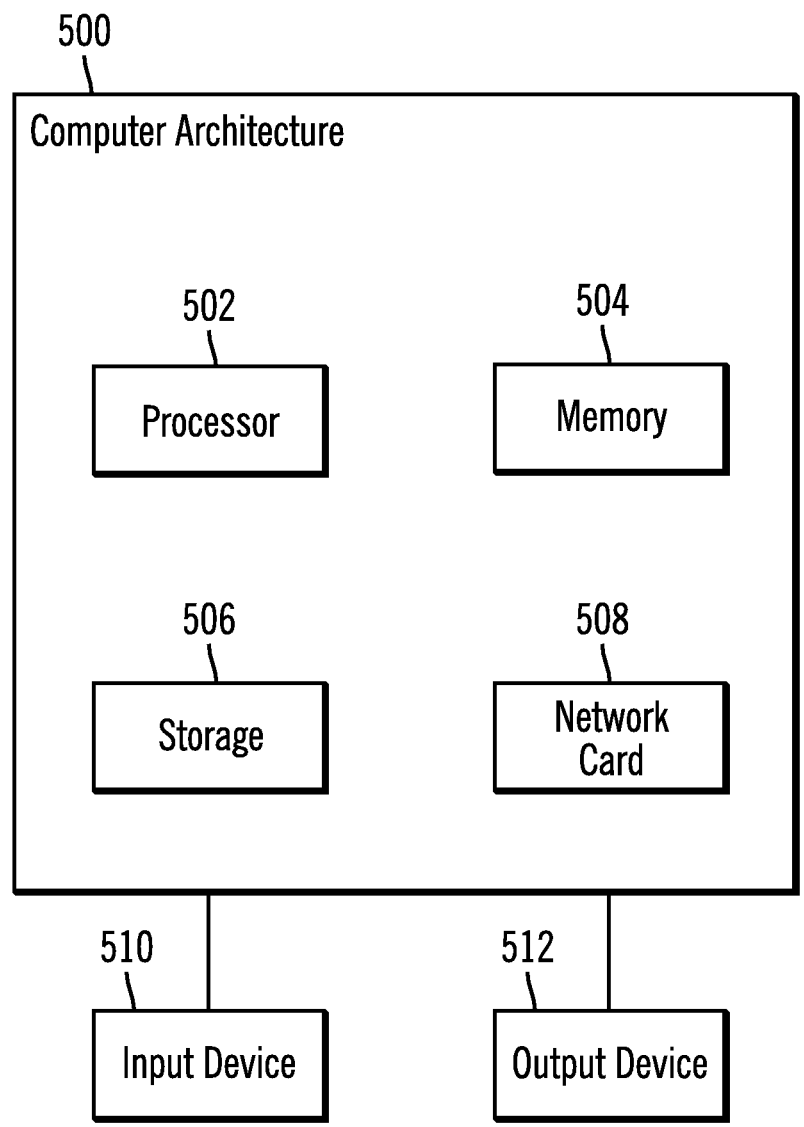
FIG. 12 illustrates an embodiment of a computer architecture.

FIG. 12 illustrates an embodiment of a computer architecture 500 that may be implemented at user/organizer computers 2a, 2b . . . 2n and the systems 4, 300 in FIGS. 1 and 8. The architecture 500 may include a processor 502 (e.g., a microprocessor), a memory 504 (e.g., a volatile memory device), and storage 506 (e.g., a non-volatile storage, such as magnetic disk drives, optical disk drives, a tape drive, etc.). The storage 506 may comprise an internal storage device or an attached or network accessible storage. Programs, including an operating system and application programs, in the storage 506 are loaded into the memory 504 and executed by the processor 502 in a manner known in the art. The architecture further includes a network card 508 to enable communication with a network. An input device 510 is used to provide user input to the processor 502, and may include a keyboard, mouse, pen-stylus, microphone, touch sensitive display screen, or any other activation or input mechanism known in the art. An output device 512 is capable of rendering information transmitted from the processor 502, or other component, such as a display monitor, printer, storage, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 5, 6, 7, 10, and 11 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   providing a meeting database having information on scheduled meetings, wherein a meeting server manages access to the meeting database;
   interfacing, by the meeting server, with an email server to provide information on meetings from the meeting database to an email database including email accounts and calendars of scheduled events for users, wherein the email server manages access to the email database and maintains a calendar component having user scheduled events, wherein the provided meeting information includes information on invitees to the meeting;
   storing, by the email server, the provided information on the meetings in the email database in response to a call from the meeting server;
   receiving, by the email server, invocation from one of the invitees that received a message to schedule the meeting, wherein the invitee makes the invocation to be added as an attendee of the meeting;
   updating, by the email server, the calendar of scheduled events in the email database for the users invoking the scheduled meeting to include information from the meeting database on the scheduled meeting in the email database;
   notifying, by the email server, the meeting server of the invitee invoking the email server to schedule the meeting; and
   updating, by the meeting server, the meeting database to indicate the invoking invitee as the attendee.

2. The method of claim 1, wherein the meeting server calls the email server to provide information on one meeting from the meeting database in response to creating information in the meeting database for the meeting.

3. The method of claim 2, wherein the information on the meeting provided to the email server includes message addresses of invitees to the meeting, wherein the message address identifies an email account and associated calendar in the email database, further comprising:
   submitting, by the meeting server, email invitations including information on one of the meetings to the message addresses of the invitees to the meeting, wherein the email invitation includes a user selectable call that invokes the email server to schedule the meeting;
   storing, by the email server, the received emails in the email accounts of the invitees in the email database; and
   receiving, by the email server, invitee invocation via the user selectable call to schedule the meeting, wherein the email server updates the calendar for the invitee to indicate the meeting as scheduled for the invitee in response to receiving the invitee invocation to schedule the meeting.

4. The method of claim 2, wherein the information on the meeting includes message addresses of invitees to the meeting that are directed to the email server maintaining the email accounts and calendars in the email database, further comprising:
   transmitting, by the email server, a message to the user accounts of the invitees of the meeting in response to the call from the meeting server; and
   receiving, by the email server, invocation from one of the invitees that received the message to schedule the meeting, wherein the email server updates the calendar for the invitee to indicate the meeting as scheduled for the invitee in response to receiving the invocation to schedule the meeting.

5. The method of claim 4, wherein the message includes a user selectable call that when selected by the invitee invokes the email server to schedule the meeting.

6. The method of claim 1, further comprising:
receiving, by the meeting server, an update to the information for one of the meetings in the meeting database;
calling, by the meeting server, the email server to provide the update for the meeting added to the meeting database to the email database to store in the email database; and
updating, by the email server, the calendars of users whose calendars include information on the updated meeting to indicate the update to the information in response to the call by the meeting server.

7. The method of claim 1, further comprising:
transmitting, by the email server, a message to the users whose calendars are scheduled with the updated meeting providing notification of the update to the calendar.

8. The method of claim 7, further comprising:
receiving, by the email server, indication that the message was viewed by one user, wherein the calendar of the user that viewed the message is updated with the update to the information for the meeting in response to receiving the indication that the message was viewed.

9. The method of claim 1, wherein the meeting database includes identifiers for meetings created in the meeting database, further comprising:
creating, by the email server, identifiers for the information on the meetings stored in the email database in response to storing the information on the meetings in the email database; and
providing, by the email server, for each of a plurality of meetings stored in the email database, an association of one identifier in the meeting database for the meeting and one identifier in the email database for the meeting.

10. The method of claim 9, further comprising:
calling, by the meeting server, the email server to provide an update to the information for one of the meetings in the meeting database including the identifier in the meeting database of the updated meeting;
determining, by the email server, from the associations the identifier in the email database associated with the received identifier of the updated message in the meeting database in response to the call from the email server to provide the update; and
using, by the email server, the determined identifier in the email database to update the information in the email database for the identified meeting with the received update.

11. The method of claim 10, wherein the information for the updated meeting in the email database indicates users whose calendars are scheduled with the updated meeting, further comprising:
updating, by the email server, the calendars of the indicated users with the received update.

12. A system, comprising:
a meeting server;
a meeting database having information on scheduled meetings, wherein the meeting server manages access to the meeting database and maintains a calendar component having user scheduled events;
an email server;
an email database including email accounts and calendars of scheduled events for users, wherein the email server manages access to the email database;
wherein the meeting server is configured to perform operations comprising interfacing with the email server to provide information on meetings from the meeting database to the email database, wherein the provided meeting information includes information on invitees to the meeting;
wherein the email server is configured to perform operations comprising:
providing information on the meetings in the email database in response to a call from the meeting server;
receiving invocation from one of the invitees that received a message to schedule the meeting, wherein the invitee makes the invocation to be added as an attendee of the meeting;
updating the calendar of scheduled events in the email database for the users invoking the scheduled meeting to include information from the meeting database on the scheduled meeting in the email database; and
notifying the meeting server of the invitee invoking the email server to schedule the meeting; and
wherein the meeting server is further configured to perform updating the meeting database to indicate the invoking invitee as the attendee.

13. The system of claim 12, wherein the meeting server calls the email server to provide information on one meeting from the meeting database in response to creating information in the meeting database for the meeting.

14. The system of claim 13, wherein the information on the meeting provided to the email server includes message addresses of invitees to the meeting, wherein the message address identifies an email account and associated calendar in the email database,
wherein the meeting server is further configured to submit email invitations including information on one of the meetings to the message addresses of the invitees to the meeting, wherein the email invitation includes a user selectable call that invokes the email server to schedule the meeting; and
wherein the email server is further configured to perform:
storing the received emails in the email account of the invitee in the email database;
receiving invocation from the invitee via the user selectable call to schedule the meeting; and
updating the calendar for the invitee to indicate the meeting as scheduled for the invitee in response to receiving the invocation to schedule the meeting.

15. The system of claim 13, wherein the information on the meeting includes message addresses of invitees to the meeting that are directed to the email server maintaining the email accounts and calendars in the email database, wherein the email server is further configured to perform:
transmitting a message to the user accounts of the invitees of the meeting in response to the call from the meeting server; and
receiving invocation from one of the invitees that received the message to schedule the meeting, wherein the email server updates the calendar for the invitee to indicate the meeting as scheduled for the invitee in response to receiving the invocation to schedule the meeting.

16. The system of claim 15, wherein the message includes a user selectable call that when selected by the invitee invokes the email server to schedule the meeting.

17. The system of claim 12,
wherein the meeting server is further configured to perform:
receiving an update to the information for one of the meetings in the meeting database;
calling the email server to provide the update for the meeting added to the meeting database to the email database to store in the email database; and wherein the email server is further configured to update the calendars of users whose calendars include information on the updated meeting to indicate the update to the information in response to the call by the meeting server.

18. The system of claim 12, wherein the email server is further configured to transmit a message to the users whose calendars are scheduled with the updated meeting providing notification of the update to the calendar.

19. The system of claim 18, wherein the email server is further configured to receive indication that the message was viewed by one user, wherein the calendar of the user that viewed the message is updated with the update to the information for the meeting in response to receiving the indication that the message was viewed.

20. The system of claim 12, wherein the meeting database includes identifiers for meetings created in the meeting database,
wherein the email server is further configured to create identifiers for the information on the meetings stored in the email database in response to storing the information on the meetings in the email database; and
wherein the email server is further configured to provide, for each of a plurality of meetings stored in the email database, an association of one identifier in the meeting database for the meeting and one identifier in the email database for the meeting.

21. The system of claim 20,
wherein the meeting server is further configured to perform calling the email server to provide an update to the information for one of the meetings in the meeting database including the identifier in the meeting database of the updated meeting;
wherein the email server is further configured to perform:
determining from the associations the identifier in the email database associated with the received identifier of the updated message in the meeting database in response to the call from the email server to provide the update; and
using the determined identifier in the email database to update the information in the email database for the identified meeting with the received update.

22. The system of claim 21, wherein the information for the updated meeting in the email database indicates users whose calendars are scheduled with the updated meeting, and wherein the email server is further configured to update the calendars of the indicated users with the received update.

23. An article of manufacture comprising a computer readable storage medium including meeting server code and email server code, wherein the meeting server code is executed to implement operations of a meeting server to communicate with a meeting database and wherein the email server code is executed to implement operations of an email server to communicate with an email database, wherein the meeting server code and the email server code are executed to perform operations, the operations comprising:
accessing, by the meeting server, the meeting database having information on scheduled meetings, wherein the meeting server code manages access to the meeting database;
interfacing, by the meeting server, with the email server to provide information on meetings from the meeting database to an email database including email accounts and calendars of scheduled events for users, wherein the email server manages access to the email database and maintains a calendar component having user scheduled events, wherein the provided meeting information includes information on invitees to the meeting;
storing, by the email server, the provided information on the meetings in the email database in response to a call from the meeting server;
receiving, by the email server, invocation from one of the invitees that received a message to schedule the meeting, wherein the invitee makes the invocation to be added as an attendee of the meeting;
updating, by the email server, the calendar of scheduled events in the email database for the users invoking the scheduled meeting to include information from the meeting database on the scheduled meeting in the email database;
notifying, by the email server, the meeting server of the invitee invoking the email server to schedule the meeting; and
updating, by the meeting server, the meeting database to indicate the invoking invitee as the attendee.

24. The article of manufacture of claim 23, wherein the meeting server calls the email server to provide information on one meeting from the meeting database in response to creating information in the meeting database for the meeting.

25. The article of manufacture of claim 24, wherein the information on the meeting provided to the email server includes message addresses of invitees to the meeting, wherein the message address identifies an email account and associated calendar in the email database, wherein the operations further comprise:
submitting, by the meeting server, email invitations including information on one of the meetings to the message addresses of the invitees to the meeting, wherein the email invitation includes a user selectable call that invokes the email server to schedule the meeting;
storing, by the email server, the received emails in the email accounts of the invitees in the email database; and
receiving, by the email server, invitee invocation via the user selectable call to schedule the meeting, wherein the email server updates the calendar for the invitee to indicate the meeting as scheduled for the invitee in response to receiving the invitee invocation to schedule the meeting.

26. The article of manufacture of claim 24, wherein the information on the meeting includes message addresses of invitees to the meeting that are directed to the email server maintaining the email accounts and calendars in the email database, wherein the operations further comprise:
transmitting, by the email server, a message to the user accounts of the invitees of the meeting in response to the call from the meeting server; and
receiving, by the email server, invocation from one of the invitees that received the message to schedule the meeting, wherein the email server updates the calendar for the invitee to indicate the meeting as scheduled for the invitee in response to receiving the invocation to schedule the meeting.

27. The article of manufacture of claim 26, wherein the message includes a user selectable call that when selected by the invitee invokes the email server to schedule the meeting.

28. The article of manufacture of claim 23, wherein the operations further comprise:
receiving, by the meeting server, an update to the information for one of the meetings in the meeting database;
calling, by the meeting server, the email server to provide the update for the meeting added to the meeting database to the email database to store in the email database; and updating, by the email server, the calendars of users whose calendars include information on the updated meeting to indicate the update to the information in response to the call by the meeting server.

29. The article of manufacture of claim 23, wherein the operations further comprise:
    transmitting, by the email server, a message to the users whose calendars are scheduled with the updated meeting providing notification of the update to the calendar.

30. The article of manufacture of claim 29, wherein the operations further comprise:
    receiving, by the email server, indication that the message was viewed by one user, wherein the calendar of the user that viewed the message is updated with the update to the information for the meeting in response to receiving the indication that the message was viewed.

31. The article of manufacture of claim 23, wherein the meeting database includes identifiers for meetings created in the meeting database, wherein the operations further comprise:
    creating, by the email server, identifiers for the information on the meetings stored in the email database in response to storing the information on the meetings in the email database; and
    providing, by the email server, for each of a plurality of meetings stored in the email database, an association of one identifier in the meeting database for the meeting and one identifier in the email database for the meeting.

32. The article of manufacture of claim 31, wherein the operations further comprise:
    calling, by the meeting server, the email server to provide an update to the information for one of the meetings in the meeting database including the identifier in the meeting database of the updated meeting;
    determining, by the email server, from the associations the identifier in the email database associated with the received identifier of the updated message in the meeting database in response to the call from the email server to provide the update; and
    using, by the email server, the determined identifier in the email database to update the information in the email database for the identified meeting with the received update.

33. The article of manufacture of claim 32, wherein the information for the updated meeting in the email database indicates users whose calendars are scheduled with the updated meeting, wherein the operations further comprise:
    updating, by the email server, the calendars of the indicated users with the received update.

34. The method of claim 1, wherein the meeting server interfaces with the email server by calling the email server with an email server Application Programming Interface (API).

35. The system of claim 12, wherein the meeting server interfaces with the email server by calling the email server with an email server Application Programming Interface (API).

36. The article of manufacture of claim 12, wherein the meeting server interfaces with the email server by calling the email server with an email server Application Programming Interface (API).

* * * * *